United States Patent
Wieringa

Patent Number: 5,928,337
Date of Patent: Jul. 27, 1999

[54] PROGRAMMABLE IMAGE PROCESSING SYSTEM INCLUDING SCANNER WITH DISPLAYING DEVICE FOR SEQUENTIAL DISPLAY OF CONTROL SIGNALS WHEN SCRIPT FILE EXECUTION PROGRAM STARTS

[75] Inventor: Fred Wieringa, Utrecht, Netherlands

[73] Assignee: Primax Electronics Ltd., Taiwan

[21] Appl. No.: 08/837,533

[22] Filed: Apr. 21, 1997

[51] Int. Cl.⁶ .................. G06F 17/30; G06F 3/02
[52] U.S. Cl. .................. 710/5; 710/72; 710/73; 712/215; 712/231; 455/464; 382/237
[58] Field of Search .................. 710/5, 1, 72, 73, 710/215, 231; 455/464; 382/237

[56] References Cited

U.S. PATENT DOCUMENTS

| | | | |
|---|---|---|---|
| 5,499,108 | 3/1996 | Cotte et al. | 358/400 |
| 5,634,092 | 5/1997 | Stokes | 395/118 |
| 5,675,780 | 10/1997 | Plant-Mason et al. | 395/606 |
| 5,754,755 | 5/1998 | Smith, Jr. | 395/183.14 |
| 5,769,719 | 6/1998 | Hsu | 463/37 |
| 5,790,652 | 8/1998 | Gulley et al. | 379/368 |

*Primary Examiner*—Thomas C. Lee
*Assistant Examiner*—Rehana Perveen

[57] ABSTRACT

An image processing system having programmable keys for recording frequently used procedures is disclosed. The scanner comprises a scanning module for scanning an document, a plurality of programmable keys for recording frequently used procedures and a program key. The computer comprises a script file generation program for generating a script file of the programmable key. The script file is generated by using the following steps: (1) press the program key to generate a script file, (2) press a programmable key to relate the script file to the programmable key, (3) generate a plurality of control signals sequentially through various control keys of the scanner, (4) store the control signals in the script file, and (5) press the program key to complete the script file.

4 Claims, 2 Drawing Sheets

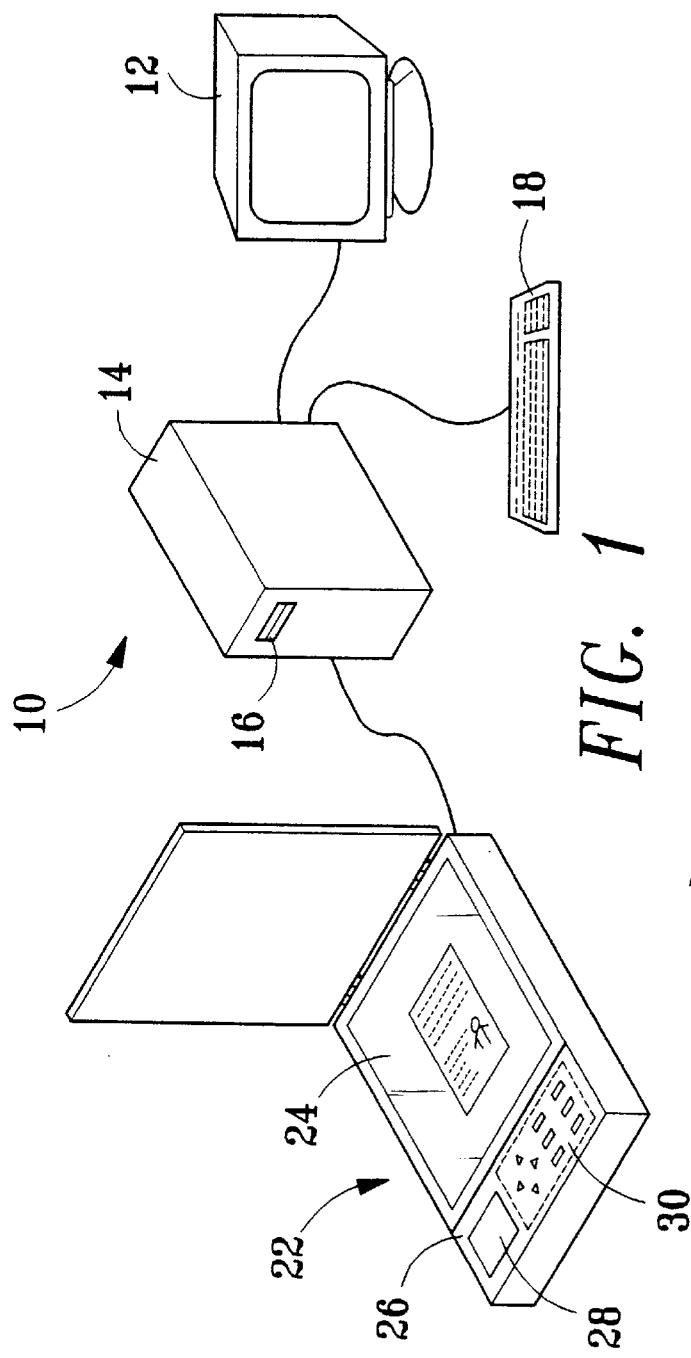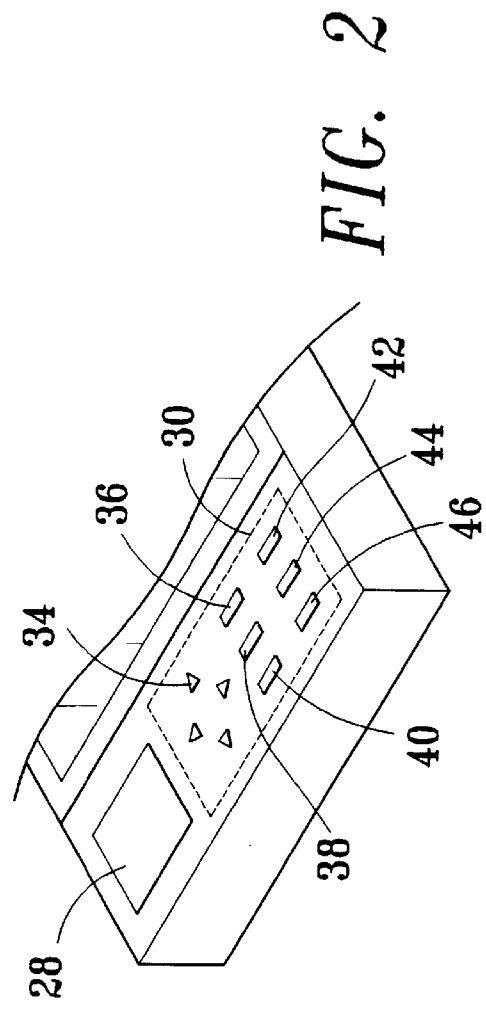

PROGRAMMABLE IMAGE PROCESSING SYSTEM INCLUDING SCANNER WITH DISPLAYING DEVICE FOR SEQUENTIAL DISPLAY OF CONTROL SIGNALS WHEN SCRIPT FILE EXECUTION PROGRAM STARTS

BACKGROUND OF THE INVENTION

1. Field of the Invention

The present invention relates to an image processing system, and more particularly, to an image processing system having a plurality of programmable keys for recording frequently used procedures.

2. Description of the Prior Art

A personal computer based image processing system usually comprises a personal computer and a scanner. The scanner provides a user interface for controlling operations of the scanner and also for selecting image processing programs stored in the personal computer to process the image signals generated by the scanner. A user has to interactively enter a sequence of control commands through the user interface to select and control the image processing programs. In some tasks multiple complex interactive steps will be involved. In such tasks a user has to correctly enter each control command and then wait until each command is completely executed in order to enter next command. Such process is quite time consuming. Any mistake occurs in the middle of the process may cause the user to repeat the whole procedure again. And if the interactive process is very complex, it may take the user a long time to figure out what to do in each step. For daily routines or frequently used procedures, the user has to repeat such process all the times and it is quite inconvenient.

SUMMERY OF THE INVENTION

It is therefore a primary objective of the present invention to provide an image processing system which can utilize programmable keys to record frequently used procedures to solve the above mentioned problem.

Briefly, in a preferred embodiment, the present invention includes an image processing system comprising:

(1) a computer having a memory for storing programs and a processor for executing the programs stored in the memory;

(2) a scanner electrically connected to the computer comprising:

(a) a scanning module for scanning a document to generate image signals, (b) an input circuit having a plurality of control keys for generating correspondent control signals, at least one programmable key for generating an execution signal, and a program key for generating a program signal, and (c) a control circuit for transmitting the image signals generated from the scanning module and the signals generated from the input circuit to the computer;

(3) an image processing program stored in the memory for processing the image signals generated from the scanning module according to the control signals generated from the control keys; and (4) a script file generation program stored in the memory for generating a script file for the programmable key and storing the program to the memory;

wherein the script file of the programmable key is generated by using the following steps:

(1) pressing the program key to initiate the script file generation program to generate a script file;

(2) pressing the programmable key to generate an execution signal and transmitting it to the script file generation program to designate the script file as the script file of the programmable key;

(3) generating a plurality of control signals sequentially by using the control keys;

(4) storing the control signals sequentially into the script file; and (5) pressing the program key to signify the script file generation program to complete the script file.

It is an advantage of the present invention that the image processing system provides at least one programmable key for recording frequently used procedures.

This and other objectives and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 1 is a perspective view of an image processing system according to the present invention.

FIG. 2 shows the detailed structure of the user interface of the scanner shown in FIG. 1.

DETAILED DESCRIPTION OF THE PREFERRED EMBODIMENT

Figure 3:
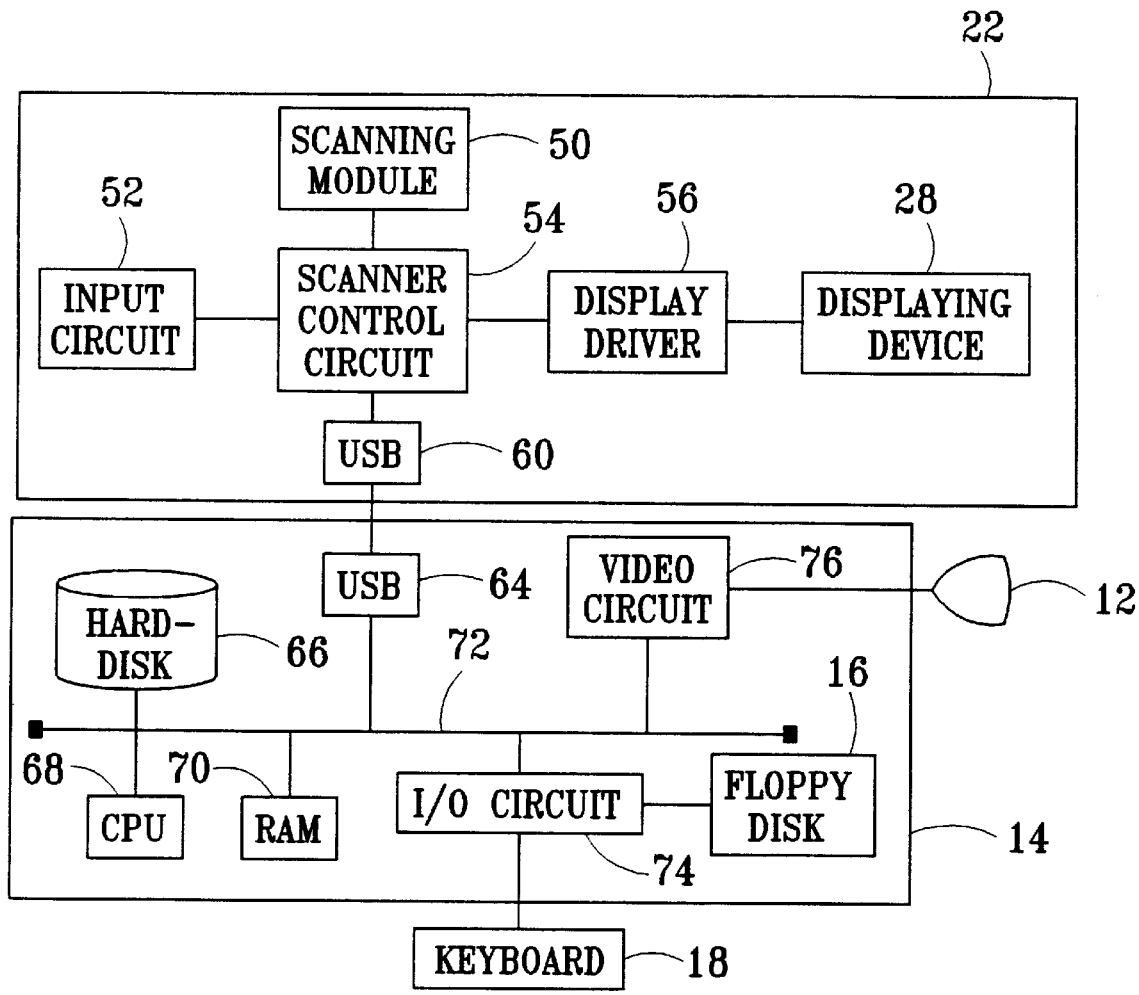
FIG. 3 is a function block diagram of the image processing system shown in FIG. 1.

Please refer to FIG. 1. FIG. 1 is a perspective view of an image processing system 10 according to the present invention. System 10 comprises a personal computer 14 having a floppy disk 16, a monitor 12 for displaying video images generated by the computer 14, a keyboard 18 for receiving data entered by a user, and a scanner 22 connected to the computer 14 for scanning documents. The scanner 22 comprises a transparent platform 24 for placing documents to be scanned, and a user interface 26 for entering user's commands. The user interface 26 comprises a displaying device 28 for displaying message signals, and a control panel 30 having a plurality of control keys built on it.

Please refer to FIG. 2. FIG. 2 shows the detailed structure of the user interface 26 of the scanner 22 shown in FIG. 1. The displaying device 28 is an LCD (liquid crystal display) used for displaying operation modes of the scanner 22 and various image processing or selection instructions. The control panel 30 comprises a plurality of control keys for generating various control signals, two programmable keys 42 and 44 for generating execution signals, and a program key 46 for generating a program signal. The control keys of the control panel 30 include four direction keys 34, a START key 36, an ESC (escape) key 38 and an ENTER key 40. A user can use the control keys to control the processing of the image signals generated from a scanned document according to the messages shown on the displaying device 28.

Please refer to FIG. 3. FIG. 3 is a function block diagram of the image processing system 10 shown in FIG. 1. System 10 comprises a computer 14, a monitor 12, a keyboard 18, and a scanner 22. The computer 14 comprises a hard disk 66 for storing programs and data, a processor 68 for executing the programs stored in the hard disk 66, a RAM (random access memory) 70 for temporarily storing the programs and data executed by the processor 68, an I/O (input/output)

circuit 74 for connecting the floppy disk 16 and the keyboard 18, a video circuit 76 which is a VGA (video graphic array) board for performing image processing functions and generating video images for the monitor 12, a USB (universal serial bus) circuit 64 for communicating with the USB circuit 60 of the scanner 22, and an internal bus 72 for connecting the internal components of the computer 14 such as hard disk 66, processor 68, memory 70, I/O circuit 74, video circuit 76, USB circuit 64, etc. The internal bus 72 can be an ISA (industrial standard architecture) bus or other standard buses.

The scanner 22 comprises a USB circuit 60, an input circuit 52, a scanning module 50, a scanner control circuit 54, a display driver 56 and a displaying device 28. The input circuit 52 is electrically connected to all the control keys of the control panel 30 shown in FIG. 2. The scanning module 50 comprises various components such as CCD (charge coupled device), stepped motor, etc., for scanning a document to generate image signals. The scanner control circuit 54 controls operations of all the elements of the scanner 22, transmits image signals generated by the scanning module 50 and various signals generated by the input circuit 52 to the computer 14, and passes message signals received from the computer 14 to the display driver 56 so that they can be displayed over the displaying device 28.

The control keys 34, 36, 38 and 40 of the input circuit are used for entering control procedures for controlling the scanner 22 or the computer 14. Each control procedure comprises a plurality of control signals sequentially generated by the user by using the control keys 34, 36, 38 and 40. The program key 46 is used for recording a control procedure and save it in a script file of a designated programmable key 42 or 44. And the programmable key 42 or 44 is used for executing it's designated script file.

Figure 4:
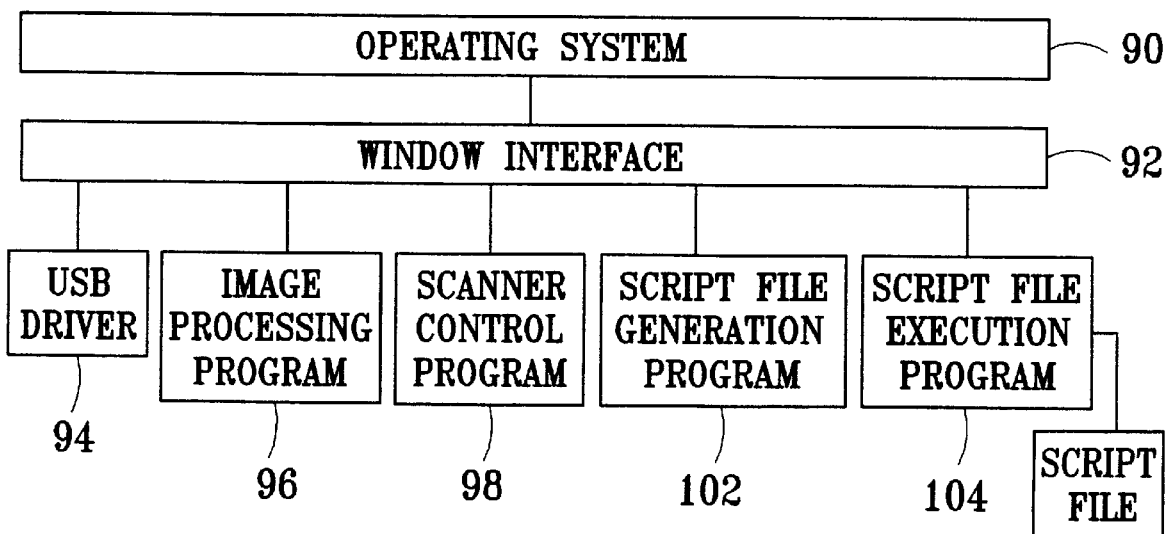
FIG. 4 is a software architecture diagram of the image processing system shown in FIG. 1.

Please refer to FIG. 4. FIG. 4 is a software architecture diagram of the image processing system 10 shown in FIG. 1. All the programs contained in this software architecture are stored in the hard disk 66 of the computer 14. When one program is executed by the processor 68, the program and related data will be temporarily stored in the memory 70 for execution by the processor 68. The software architecture comprises an operating system 90 for controlling operations of the computer 14, a window interface 92 executed under the operating system 90 for supporting each program executed under it and a plurality of application programs executed under the window interface 92.

The USB driver 94 is used for receiving and transmitting USB packets through the USB circuit 64 of the computer 14. The scanner control program 98 is used for controlling operations of the scanner 22, transmitting the image signals and control signals received from the scanner 22 to the image processing program 96, activating the script file generation program 102 to generating a script file according to a program signal generated by the program key 46, and activating the script file execution program 104 according to an execution signal generated by the programmable key 42 or 44. The scanner control program 98 also transmits message signals generated by other programs to the displaying device 28 through the scanner control circuit 54 of the scanner 22.

The image processing program 96 can be any application program which has image processing or file processing capability to process the image signals generated by the scanner 22, such as OCR (optical character recognition) programs, graphic or drawing programs, or word processing programs, other utility programs such as facsimile program, etc. The user can activate one of these image processing programs by using the control keys over the control panel 30 according to a selection message shown in the displaying device 28 of the scanner 22 which is displayed by the scanner control program 98. After one image processing program is activated, the scanner control program 98 can also transmit one or more message signals generated by the activated image processing program which contain image processing instructions in it to the displaying device 28 of the scanner 22 so that the user can select a proper image processing function provided by the activated processing program. And the activated image processing program will process the image signals generated by the scanner 22 according to the control signals generated by the control keys.

The script file generation program 102 is used for generating a script file 106 for programmable key 42 or 44. Each script file 106 is used for keeping a control procedure which contains a series of control signals sequentially generated by using the control keys of the scanner 22. The script file execution program 104 is used for executing the control signals stored in the script file 106 to complete the control procedure.

A script file is generated by the script file generation program 102 according to the following process:

(1) press the program key 46 to activate the script file generation program 102 so that it can generates a new script file 106;

(2) press a programmable key 42 or 44 to generate an execution signal and transmit it to the script file generation program 102 so that the newly generated script file can be designated to the pressed programmable key;

(3) generate a plurality of control signals sequentially by using the control keys of the input circuit 52;

(4) store the control signals sequentially into the script file 106; and (5) press the program key 46 again to generate another program signal and transmit it to the script file generation program 102 to complete the script file 106 and terminate the process.

In step (1), the scanner control program 98 will activate the script file generation program 102 to generate a script file 106 for storing the control signals to be entered according to the program signal generated by the program key 46. In step (2), after the user presses the programmable key 42 or 44, the scanner control program 98 will transmit the execution signal to the script file generation program 102 to designate the newly generated script file instead of activating the script file execution program 104.

In step (3), the user can use the displaying device 28 of the scanner 22 and the control keys 34, 36, 38 and 40 of the control panel 30 to enter a control procedure sequentially as usual. After the scanner control program 98 receives these control signals, it will transmit these control signals to the image processing program 96 so that it can process the image signals generated later on from the scanner 22 according to these control signals. In step (4), the scanner control program 98 will also pass these control signals to the script file generation program 102 so that they can be stored in the script file 106. Finally in step (5), the program key 46 is pressed again to complete the script file 106 and terminate the process.

After a script file is generated and designated according to the above process, it can be executed by simply pressing the designated programmable key 42 or 44. The scanner control program 98 will activate the script file execution program 104 to process the script file according to the execution signal generated by the pressed programmable key 42 or 44. When the script file execution program 104 starts executing a script file 106, the script file execution program 104 will transmit the control signals stored in the script file 106 sequentially to the image processing program 96 so that it can process the image signals generated from the scanning module 50 according to the control signals. The script file execution program 104 can also transmit the control signals stored in the script file 106 back to the displaying device 28 of the scanner 22 so that the user can understand what is being executed in the computer 14.

The above described programmable keys and script files are very convenient and easy to use. By using a programmable key and a script file to replace a complex control procedure saves a lot of time and efforts for a user. This greatly improve the efficiency of the traditional image processing systems.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing system comprising:
   (1) a computer having a memory for storing programs and a processor for executing the programs stored in the memory;
   (2) a scanner electrically connected to the computer comprising:
      (a) a scanning module for scanning a document to generate image signals,
      (b) an input circuit having a plurality of control keys for generating correspondent control signals, at least one programmable key for generating an execution signal, and a program key for generating a program signal,
      (c) a control circuit for transmitting the image signals generated from the scanning module and the signals generated from the input circuit to the computer, and
      (d) a displaying device connected to the control circuit for displaying message signals;
   (3) an image processing program stored in the memory for processing the image signals generated from the scanning module according to the control signals generated from the control keys; and
   (4) a script file generation program stored in the memory for generating a script file for the programmable key and storing the program to the memory;

wherein the script file of the programmable key is generated by using the following steps:
   (1) pressing the program key to initiate the script file generation program to generate a script file;
   (2) pressing the programmable key to generate an execution signal and transmitting it to the script file generation program to designate the script file as the script file of the programmable key;
   (3) generating a plurality of control signals sequentially by using the control keys;
   (4) storing the control signals sequentially into the script file; and
   (5) pressing the program key to signify the script file generation program to complete the script file;

wherein when the script file execution program starts executing the script file of the programmable key, the script file execution program will transmit the control signals stored in the script file sequentially to the control circuit of the scanner so that the control circuit can display the control signals sequentially over the displaying device.

2. The computer image processing system of claim 1 further comprising a scanner control program stored in the memory for:
   (1) controlling operations of the scanner,
   (2) transmitting the image signals and control signals received from the scanner to the image processing program,
   (3) activating the script file generation program according to the program signal, and
   (4) activating the script file execution program according to the execution signal.

3. The computer image processing system of claim 2 wherein when the script file execution program starts executing a script file of the programmable key, the script file execution program sequentially transmits the control signals stored in the script file to the image processing program so that it can process the image signals generated from the scanning module according to the control signals.

4. The computer image processing system in claim 1 wherein before a user inputs the control signals by using the control keys, the scanner control program transmits a message signal containing an image processing instruction generated from the image processing program to the control circuit of the scanner so that the user can choose a proper control key to input according to the image processing instruction displayed over the displaying device.

* * * * *